(12) United States Patent
Hirajima et al.

(10) Patent No.: US 11,697,862 B2
(45) Date of Patent: Jul. 11, 2023

(54) MINERAL PROCESSING METHOD

(71) Applicants: KYUSHU UNIVERSITY, NATIONAL UNIVERSITY CORPORATION, Fukuoka (JP); SUMITOMO METAL MINING CO., LTD., Tokyo (JP)

(72) Inventors: Tsuyoshi Hirajima, Fukuoka (JP); Hajime Miki, Fukuoka (JP); Gde Pandhe Wisnu Suyantara, Fukuoka (JP); Yuji Imaizumi, Niihama (JP); Yuji Aoki, Niihama (JP); Eri Takida, Niihama (JP)

(73) Assignees: KYUSHU UNIVERSITY, NATIONAL UNIVERSITY CORPORATION, Fukuoka (JP); SUMITOMO METAL MINING CO., LTD., Tokyo (JP)

( * ) Notice: Subject to any disclaimer, the term of this patent is extended or adjusted under 35 U.S.C. 154(b) by 417 days.

(21) Appl. No.: 16/470,228

(22) PCT Filed: Jun. 1, 2018

(86) PCT No.: PCT/JP2018/021115
§ 371 (c)(1),
(2) Date: Jun. 16, 2019

(87) PCT Pub. No.: WO2019/008962
PCT Pub. Date: Jan. 10, 2019

(65) Prior Publication Data
US 2019/0360072 A1 Nov. 28, 2019

(30) Foreign Application Priority Data

Jul. 7, 2017 (JP) .................................. 2017-133942
Apr. 16, 2018 (JP) .................................. 2018-078157

(51) Int. Cl.
C22B 34/34 (2006.01)
B03D 1/002 (2006.01)
(Continued)

(52) U.S. Cl.
CPC .............. *C22B 34/34* (2013.01); *B03D 1/002* (2013.01); *C22B 3/22* (2013.01); *C22B 15/0084* (2013.01)

(58) Field of Classification Search
CPC ....... C22B 34/34; C22B 3/22; C22B 15/0084; C22B 34/00; C22B 15/00; C22B 15/0002;
(Continued)

(56) References Cited

U.S. PATENT DOCUMENTS 3,339,730 A * 9/1967 Boutin ................. B03D 1/1462
209/166
4,514,292 A * 4/1985 Burdick ................ B03D 1/012
209/167
(Continued)

FOREIGN PATENT DOCUMENTS

CL 200402366 A 1/2006
CL 200503139 A 5/2006
(Continued)

OTHER PUBLICATIONS

Michaud, David. Flotation Reagents, Jun. 8, 2016, 911 Metallurgist (Year: 2016).*
(Continued)

*Primary Examiner* — Vanessa T. Luk
*Assistant Examiner* — Nikolas Takuya Pullen
(74) *Attorney, Agent, or Firm* — Kratz, Quintos & Hanson, LLP

(57) ABSTRACT

A mineral processing method capable of efficiently separating a copper mineral from a molybdenum mineral is provided. The mineral processing method includes: a condi-
(Continued)

tioning step of adding sulfite as a surface treatment agent to a mineral slurry containing a copper mineral and a molybdenum mineral; and a flotation step of performing flotation using the mineral slurry after the conditioning step. The hydrophilicity of the copper mineral can be selectively enhanced by sulfite, so as to be able to produce a difference in hydrophilicity between the copper mineral and the molybdenum mineral. Therefore, the molybdenum mineral can be selectively caused to float, and the copper mineral and the molybdenum mineral can be efficiently separated from each other.

4 Claims, 4 Drawing Sheets

(51) Int. Cl.
*C22B 3/22* (2006.01)
*C22B 15/00* (2006.01)

(58) Field of Classification Search
CPC ............ C22B 15/0004; C22B 15/0063; C22B 15/0086; C22B 15/0089; C22B 15/0067; C22B 15/0071; C22B 15/0091; C22B 15/008; B03D 1/002; B03D 1/00; B03D 1/001; B03D 1/02
See application file for complete search history.

(56) References Cited

U.S. PATENT DOCUMENTS 4,549,959 A * 10/1985 Armstrong ............ B03D 1/002
209/167
6,036,025 A * 3/2000 Clark ..................... B03D 1/012
209/164

FOREIGN PATENT DOCUMENTS

| | | |
|---|---|---|
| CL | 201602580 A | 3/2017 |
| JP | S45-016322 | 6/1970 |
| JP | H5-195106 A | 8/1993 |
| JP | 2010-229542 A | 10/2010 |
| JP | 2014-188428 A | 10/2014 |
| JP | 2017-95763 A | 6/2017 |
| WO | 2017/110462 A1 | 6/2017 |

OTHER PUBLICATIONS

Written Opinion of the International Searching Authority for International Application No. PCT/JP2018/021115 dated Aug. 28, 2019 (3 pages, 3 pages translation, 6 pages total).
Rao, G. V., et al.; "Column Flotation to Recover Molybdenite From Rakha Copper Concentrate Part I: Conventional Rougher Flotation of Molybdenite With Sodium Hydrogen Sulphide"; Transactions of the Indian Institutes of Metals; 1998; vol. 51; No. 6; pp. 473-478.
Office Action of corresponding Chilean Patent Application No. 201902587 dated May 14, 2020 (2 sheets, 2 sheets translation, 4 sheets total).

* cited by examiner

MINERAL PROCESSING METHOD

TECHNICAL FIELD

The present invention relates to a mineral processing method. The present invention further specifically relates to a mineral processing method for separating copper minerals from molybdenum minerals.

BACKGROUND ART

In the field of copper smelting, various methods for recovering copper from raw materials such as copper ores and copper concentrates containing copper have been proposed. For example, the following processings are performed to recover copper from copper ores.

(1) Mineral Processing Step

In the mineral processing step, copper ores extracted from a mine are ground, water is added to form a slurry, and then flotation is performed. Flotation is performed by adding a flotation agent composed of a depressant, a frothing agent, a collector, and the like to the slurry, blowing air into the slurry to cause copper minerals to float and gangue to precipitate for separation. A copper concentrate with a copper grade of approximately 30% can be obtained.

(2) Pyrometallurgical Smelting Step

In the pyrometallurgical smelting step, the copper concentrate obtained in the above mineral processing step melts by the use of a furnace such as a flash furnace, and is then refined in a converter and a refining furnace to obtain crude copper with a copper grade of about 99%. The crude copper is cast into anodes to be used in the next electrolysis step.

(3) Electrolysis Step

In the electrolysis step, the anodes are inserted into an electrolytic cell filled with a sulfuric acidic solution (electrolytic solution) and electric current is passed between the anodes and cathodes to perform electrolytic refining. As a result of electrolytic refining, copper is dissolved from the anodes and deposited on the cathodes as electrolytic copper with a purity of 99.99%.

Meanwhile, most copper is present as a sulfide mineral such as chalcopyrite and bornite in a copper sulfide ore. In a mine having copper deposits referred to as porphyry type, chalcopyrite and bornite in ores are accompanied by molybdenite and enargite.

Molybdenum contained in molybdenite is a valuable element which is used for special steel alloy components, catalysts for petroleum refining, lubricants, and the like. Furthermore, when molybdenite melts in a furnace, volatilized molybdenum adheres to the facility to accelerate corrosion. Accordingly, separation of copper minerals from molybdenum minerals is required in a mineral processing step.

Separation of copper minerals from molybdenum minerals is often performed by flotation because of its excellent industrial handleability, cost, and separability. The flotation involves adding as a depressant a sulfidizing agent such as sodium hydrogensulfide (NaHS) to prevent copper minerals from floating, while allowing molybdenum minerals to float for separation. However, it is difficult to set conditions for mineral processing in the case of flotation using sodium hydrogensulfide. Moreover, when a mineral slurry is acidic, hydrogen sulfide; that is, a hazardous gas is generated from the slurry to which sodium hydrogensulfide has been added.

Furthermore, both copper minerals and molybdenum minerals have strong floating nature, and thus separation of them through flotation is extremely difficult. Hence, it has been attempted to facilitate separation by performing flotation after the treatment of these minerals.

Patent Literature 1 discloses a method for performing flotation after ozone oxidation of the surface of minerals. More specifically, a copper concentrate obtained by copper roughening and copper selection is subjected to molybdenum flotation. At the time point when the molybdenite content of the thus obtained floating ore is about 1 wt %, the floating ore is subjected to ozone oxidation. The floating ore is again subjected to flotation, thereby recovering the molybdenum mineral as a floating ore.

Patent Literature 2 discloses a method for performing flotation after plasma treatment of the surface of minerals. More specifically, a mixture of a copper-containing mineral and a molybdenum-containing mineral is subjected to plasma irradiation in an atmosphere where oxygen is used as an oxidizing agent. After plasma treatment, the mixture is washed with an aqueous solution of an alkali metal salt. After washing, the mixture is subjected to flotation, so as to separate the copper-containing mineral from the molybdenum-containing mineral.

Patent Literature 3 discloses that a concentrate is subjected to surface treatment with an oxidizing agent leading to no generation of harmful ions in a pulp (slurry) as a result of reaction, such as hydrogen peroxide, ozone, or another reagent, followed by selection, so as to separate a target component with priority.

CITATION LIST

Patent Literature

[Patent Literature 1] Japanese Unexamined Patent Publication No. H5-195106
[Patent Literature 2] Japanese Unexamined Patent Publication No. 2014-188428
[Patent Literature 3] Japanese Examined Patent Publication No. S45-016322

SUMMARY OF INVENTION

Technical Problem

However, in the method of Patent Literature 1, even sulfur in minerals is oxidized by ozone to generate sulfur dioxide. Under acidic conditions, there is a risk of generation of hydrogen sulfide. Moreover, since mineral slurries are acidic, there is a risk of partial dissolution of copper and discharge of such copper together with drainage.

The method of Patent Literature 2 requires plasma treatment, however, no large plasma irradiation apparatus is known. Therefore, industrial-scale implementation of the method is difficult.

Patent Literature 3 only describes the effects of the oxidizing agent on galena (lead mineral) with a collector adsorbed on the surface, and describes nothing about oxidation of copper minerals and molybdenum minerals.

In view of the above circumstances, an object of the present invention is to provide a mineral processing method by which copper minerals and molybdenum minerals can be efficiently separated from each other.

Solution to Problem

The mineral processing method of a $1^{st}$ invention includes:

a conditioning step of adding sulfite as a surface treatment agent to a mineral slurry containing a copper mineral and a molybdenum mineral; and a flotation step of performing flotation using the mineral slurry after the conditioning step.

The mineral processing method of a $2^{nd}$ invention includes, in the $1^{st}$ invention, adjusting the pH of the liquid phase of the mineral slurry to range from 8 to 11.5 in the conditioning step.

The mineral processing method of a $3^{rd}$ invention includes;

in the $1^{st}$ or the $2^{nd}$ invention, the conditioning step including a dispersion step of stirring the mineral slurry to disperse mineral particles contained in the mineral slurry;

a dilution step of diluting the mineral slurry after the dispersion step; and a retaining step of retaining the mineral slurry for a predetermined time period after the dilution step, wherein in any one of the dispersion step, the dilution step and the retaining step, the surface treatment agent is added to the mineral slurry.

In the mineral processing method of a $4^{th}$ invention, and in the $1^{st}$, $2^{nd}$ or $3^{rd}$ invention, the surface treatment agent is sodium sulfite or sodium hydrogen sulfite.

In the mineral processing method of a $5^{th}$ invention and in the $1^{st}$, $2^{nd}$, $3^{rd}$ or $4^{th}$ invention, the copper mineral is a mixed copper sulfide mineral containing chalcopyrite, bornite, and chalcocite, and the molybdenum mineral is molybdenite.

Advantageous Effects of Invention

According to the present invention, the hydrophilicity of a copper mineral is selectively enhanced by sulfite, so as to be able to produce a difference in hydrophilicity between the copper mineral and the molybdenum mineral. Therefore, the molybdenum mineral can be selectively caused to float, and the copper mineral and the molybdenum mineral can be efficiently separated from each other.

DESCRIPTION OF EMBODIMENTS

Next, the embodiments of the present invention are as described below on the basis of drawings.

Figure 1:
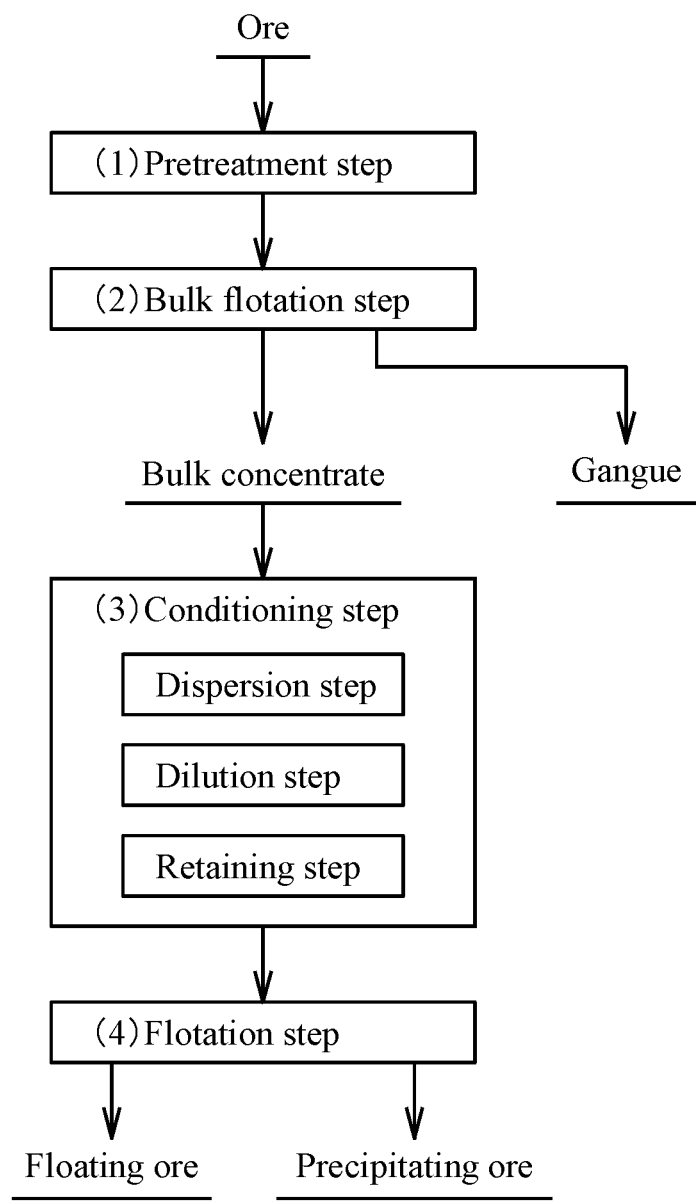
FIG. 1 shows steps of the mineral processing method according to an embodiment of the present invention.

As shown in FIG. 1, the mineral processing method according to an embodiment of the present invention includes (1) a pretreatment step, (2) a bulk flotation step, (3) a conditioning step, and (4) a flotation step.

Ores that are raw materials may contain at least a copper-containing mineral (hereinafter, referred to as "copper mineral"), and a molybdenum-containing mineral (hereinafter, referred to as "molybdenum mineral"). Examples of a copper mineral include chalcopyrite ($CuFeS_2$), bornite ($Cu_5FeS_4$), enargite ($Cu_3AsS_4$), chalcocite ($Cu_2S$), and tennantite ($(Cu, Fe, Zn)_{12}(Sb, As)_4S_{13}$). Examples of a molybdenum mineral include molybdenite ($MoS_2$).

The mineral processing method of the embodiment is suitably used for separation of a copper mineral from a molybdenum mineral. In a mine having copper deposits referred to as porphyry type, chalcopyrite and bornite in ores are accompanied by molybdenite, enargite, and the like. Accordingly, the mineral processing method of the embodiment is suitably used for ores extracted from porphyry-type copper deposits.

(1) Pretreatment Step

In the pretreatment step, ore crushing, mineral slurry production, removal of gangue and the like are performed.

Ores are crushed and ground to obtain mineral particles. The particle size of mineral particles is adjusted according to the sizes of minerals contained in the ores, so as to obtain individual minerals. For example, adjustment is generally performed to result in about 100-μm undersize particles in the case of chalcopyrite, and about 30-μm undersize particles in the case of molybdenite. In actual operation using an ore containing various minerals as a raw material, the ore is crushed to result in about 100-μm undersize particles, and then, in view of flotation results and the like, the ore particle size is generally adjusted to satisfy optimum conditions.

In addition, when mineral particles are stored for a long time period after crushing, the surface condition of the mineral may be altered due to an adherent and the like. In such a case, it is preferred to remove adherents on the mineral surface before the introduction of mineral particles into the next step. A method for removing adherents is not particularly limited, and examples thereof include nitric acid cleaning, and frictional pulverization (attrition).

Water is added to mineral particles (crushed ore) to produce a mineral slurry. Production of such a slurry enables not only to perform flotation, but also to easily perform conditioning following the pretreatment step.

Calcium ions or magnesium ions contained in the liquid phase of the mineral slurry are known to adversely affect flotation. Hence, water to be added to mineral particles is preferably pure water containing no impurity ions. Ion exchanged water may also be used industrially.

Gangue contained in ores is preferably removed as necessary. Various mineral processing methods including flotation can be employed for removing gangue.

(2) Bulk Flotation Step

In the bulk flotation step, a sulfide mineral and the remaining gangue contained in a mineral slurry are separated from each other by flotation. Bulk flotation involves adding a flotation agent composed of a frothing agent, a collector, and the like to a mineral slurry, blowing air into the mixture to cause various sulfide minerals to float together, and gangue to precipitate for separation. Examples of a frothing agent include pine oil and MIBC (methyl isobutyl carbinol). Examples of a collector include diesel oil, kerosene oil, a mercaptan-based collector, and a thiocarbamate-based collector.

A sulfide mineral obtained by bulk flotation is referred to as a bulk concentrate. When an ore extracted from a porphyry-type copper deposit is used as a raw material, mineral proportions in the bulk concentrate, the grade of copper and the same of molybdenum are as shown in Table 1. Here, mineral proportions are the results found by MLA analysis, and the grade of copper and the same of molybdenum are the results found by chemical analysis. In addition, MLA (Mineral Liberation Analyzer) is a mineral analyzing apparatus on the basis of a scanning electron microscope having an energy dispersion type X-ray analyzer.

TABLE 1

(Unit: wt %)

| Chalcopyrite | Bornite | Chalcocite | Molybdenite | Cu grade | Mo grade |
|---|---|---|---|---|---|
| 50-60 | 1-3 | 7.0 or less | 1-11 | 20-30 | 6 or less |

As is understood from Table 1, the molybdenum concentrate contains at least a copper mineral and a molybdenum mineral. The copper mineral is a mixed copper sulfide mineral containing chalcopyrite as a principal component, and bornite and chalcocite. The molybdenum mineral is molybdenite.

(3) Conditioning Step

In the conditioning step, a surface treatment agent is added to a mineral slurry containing a copper mineral and a molybdenum mineral. As a surface treatment agent, sulfite is used. Examples of sulfite include sodium sulfite ($Na_2SO_3$) and sodium hydrogen sulfite ($NaHSO_3$).

When sulfite is added to the mineral slurry, the surface of mineral particles of the copper mineral is coated with hydrophilic substances. More specifically, copper ions and iron ions contained in the copper mineral precipitate to adhere to the surface of mineral particles. Moreover, in the case of copper minerals containing metal elements other than copper, such as chalcopyrite, bornite, and tennantite, metal hydroxide is generated on the surface of mineral particles. Both copper sulfate and metal hydroxide have high hydrophilicity, and thus copper minerals with copper sulfate and metal hydroxide adhering to the surface has increased hydrophilicity. On the other hand, molybdenum minerals contain no copper and no metal element other than copper, and thus no hydrophilic substance is generated and the molybdenum minerals remain as hydrophobic minerals.

As described above, addition of sulfite to a mineral slurry results in selectively enhanced hydrophilicity of the copper mineral, so as to produce a difference in hydrophilicity between the copper mineral and the molybdenum mineral. Therefore, in the subsequent flotation step, the molybdenum mineral can be selectively caused to float, and the copper mineral and the molybdenum mineral can be efficiently separated from each other.

Meanwhile, when mineral particles are oxidized using an oxidizing agent, the degree of oxidation of minerals tends to be excessive, and both the hydrophilicity of the copper mineral and the same of the molybdenum mineral may be increased. Moreover, when sodium hydrogen sulfide is added to a mineral slurry, hydrogen sulfide that is a hazardous gas may be generated. However, when sulfite is added as described in the embodiment, a difference in hydrophilicity can be produced between the copper mineral and the molybdenum mineral, and, no hydrogen sulfide is generated.

A pH adjusting agent is added to a mineral slurry, and thus the pH of the liquid phase of the mineral slurry is preferably adjusted to range from 8 to 11.5. Accordingly, while a hydrophilic substance is generated on the surface of the copper mineral, the surface condition of the molybdenum mineral can be maintained.

From a viewpoint that metal hydroxide is generated on the surface of the copper mineral, the pH of the liquid phase of the mineral slurry is preferably adjusted to be 10 or higher. This is because hydroxide ions allowed to be sufficiently present in the liquid phase of a mineral slurry facilitates the generation of an increased amount of metal hydroxide.

Sulfite functions as a reducing agent to reduce the surface of a molybdenum. When the surface has been oxidized, existing molybdenum oxide is reduced for further hydrophobization.

When sodium hydrogen sulfite is used as a surface treatment agent, the addition of the surface treatment agent tends to lower the pH of the liquid phase of the mineral slurry. Accordingly, a pH adjusting agent such as sodium hydroxide is preferably added to maintain the pH of the liquid phase of the mineral slurry.

Note that when sodium hydrogen sulfite is used as a surface treatment agent, the concentration of sodium hydrogen sulfite in the liquid phase of the mineral slurry is preferably 0.1 mol/L or more. When sodium sulfite is used as a surface treatment agent, the concentration of sodium sulfite in the liquid phase of the mineral slurry is preferably 0.005 mol/L or more. In this manner, a difference in flotation recovery rate between the copper mineral and the molybdenum mineral increases, and thus the copper mineral and the molybdenum mineral can be efficiently separated from each other by flotation.

The specific treatments in the conditioning step are not particularly limited, as long as a reaction can be caused to take place as desired by the addition of a surface treatment agent to a mineral slurry. At this time, as described below, the conditioning step is preferably composed of a dispersion step, a dilution step, and a retaining step.

(3.1) Dispersion Step

In the dispersion step, aggregated mineral particles are dispersed by stirring a mineral slurry. Dispersion of mineral particles facilitates the contact between the surface of the mineral particles and a surface treatment agent. Furthermore, stirring of the mineral slurry causes the removal of adherents on the surface of mineral particles, and facilitates the contact between the surface of the mineral particles and the surface treatment agent.

(3.2) Dilution Step

In the dilution step, water is added to a mineral slurry for dilution. Water to be added to a mineral slurry is preferably pure water containing no impurity ions. Ion exchanged water may be used industrially.

The dilution step is provided after the dispersion step, so that the solid content ratio in the mineral slurry in the dispersion step can be increased. In this manner, because of the low liquid volume of the mineral slurry, stirring efficiency can be improved and mineral particles can be sufficiently stirred. Moreover, dilution of the mineral slurry results in increased distances among mineral particles in the mineral slurry, so that the surface treatment agent contacts sufficiently with mineral particles. The diluted mineral slurry is introduced into the flotation step, so as to avoid molybdenum mineral particles that should precipitate from getting caught in floating bubbles or copper mineral particles and floating.

(3.3) Retaining Step

In the retaining step, a mineral slurry is retained for a predetermined time period to accelerate the reaction of mineral particles with a surface treatment agent. Note that, the surface treatment agent may be added to the mineral slurry in any of the dispersion step, the dilution step, and the retaining step, but is preferably added in the retaining step. The dispersion step has an effect of removing adherents on the surface of mineral particles via stirring. Addition of a surface treatment agent in the dispersion step has a risk of stripping off of metal hydroxide generated on the surface of the copper mineral.

The retention time in the retaining step is not particularly limited, but is preferably 5 minutes or longer. Furthermore, the mineral slurry is preferably stirred as necessary for dispersion of a surface treatment agent.

(4) Flotation Step

In the flotation step, flotation is performed using the conditioned mineral slurry. Flotation separates the molybdenum mineral as a floating ore and the copper mineral as a precipitating ore, from each other. Apparatuses and methods to be employed for flotation are not particularly limited, and a general multi-stage flotation device may be employed.

As gas to be blown into a mineral slurry in flotation, oxygen-free gas, for example, nitrogen is preferably used. Specifically, flotation is preferably performed by blowing oxygen-free gas into the mineral slurry. This can prevent the conditioned ore from contacting with oxygen to alter the degree of oxidation of the ore.

In the flotation step, a flotation agent composed of a depressant, a frothing agent, a collector and the like is added to a mineral slurry. In addition, a flotation agent may be added in the conditioning step.

pH adjustment is preferably performed so that the pH of the liquid phase of the mineral slurry is appropriate for flotation. It is known that the settleability of chalcopyrite is increased at about pH9 to 11. Accordingly, the pH of the mineral slurry is preferably adjusted to range from about pH9 to 11.

The pH adjusting agent is not particularly limited. As alkali, sodium hydroxide (NaOH), potassium hydroxide (KOH), calcium hydroxide ($Ca(OH)_2$), calcium carbonate ($CaCO_3$) and the like can be used. As acid, sulfuric acid ($H_2SO_4$), hydrochloric acid (HCl) and the like can be used. When the pH adjusting agent is used in the form of aqueous solution, the concentration thereof is not particularly limited and may be any concentration as long as it does not hinder the adjustment of a target pH of the mineral slurry.

The pH adjustment of the mineral slurry may be performed before the flotation step. Specifically, pH adjustment may be performed in the conditioning step. Moreover, when the pH of the liquid phase fluctuates over the processing time of the flotation step, pH adjustment may be performed even in the middle of the step.

As described above, the addition of a surface treatment agent to a mineral slurry can produce a difference in hydrophilicity between a copper mineral and a molybdenum mineral. Therefore, while the copper mineral is caused to precipitate, the molybdenum mineral can be selectively caused to float. As a result, the copper mineral and the molybdenum mineral can be efficiently separated from each other.

Note that steps from the conditioning step (dispersion step, dilution step, and retaining step) to the flotation step may be arranged to proceed sequentially within a flotation device. This saves time and effort required for transportation of the mineral slurry.

EXAMPLES

Next, Examples are as described below.

(Surface Treatment Test)

First, the effects of a surface treatment agent on minerals were tested.

Chalcopyrite was prepared as a copper mineral and molybdenite was prepared as a molybdenum mineral. Each mineral lump was embedded in resin for microscopy and then the surface was polished. The polished surface of each sample was contacted with a 0.1 mol/L sodium sulfite aqueous solution as a surface treatment agent. The pHs of the surface treatment agent were 3 types: pH8.0, 10.8, and 11.5. In addition, the time for surface treatment was 60 minutes.

Figure 2:
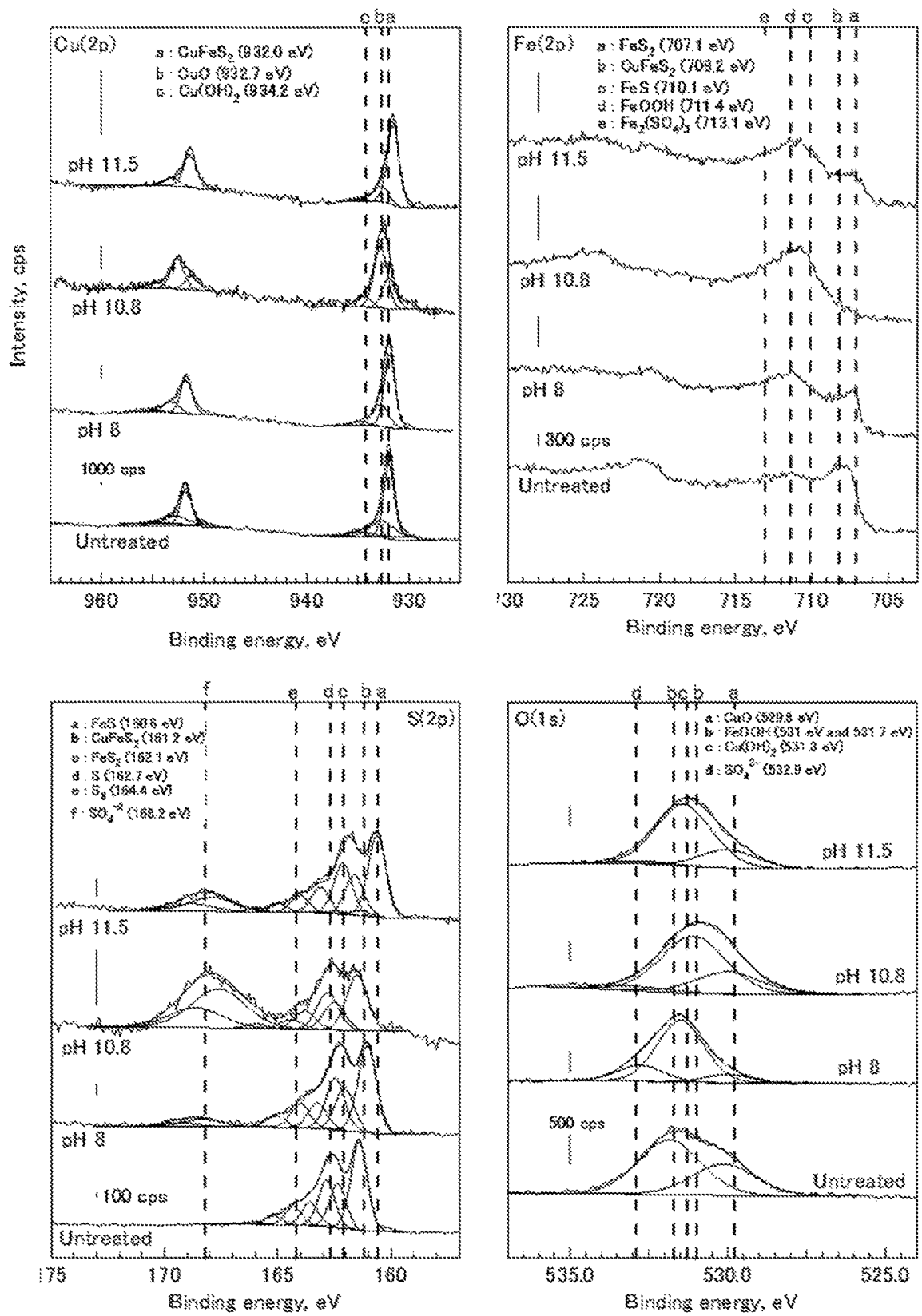
FIG. 2 is a graph showing the results of measuring chalcopyrite in a surface treatment test.
Figure 3:
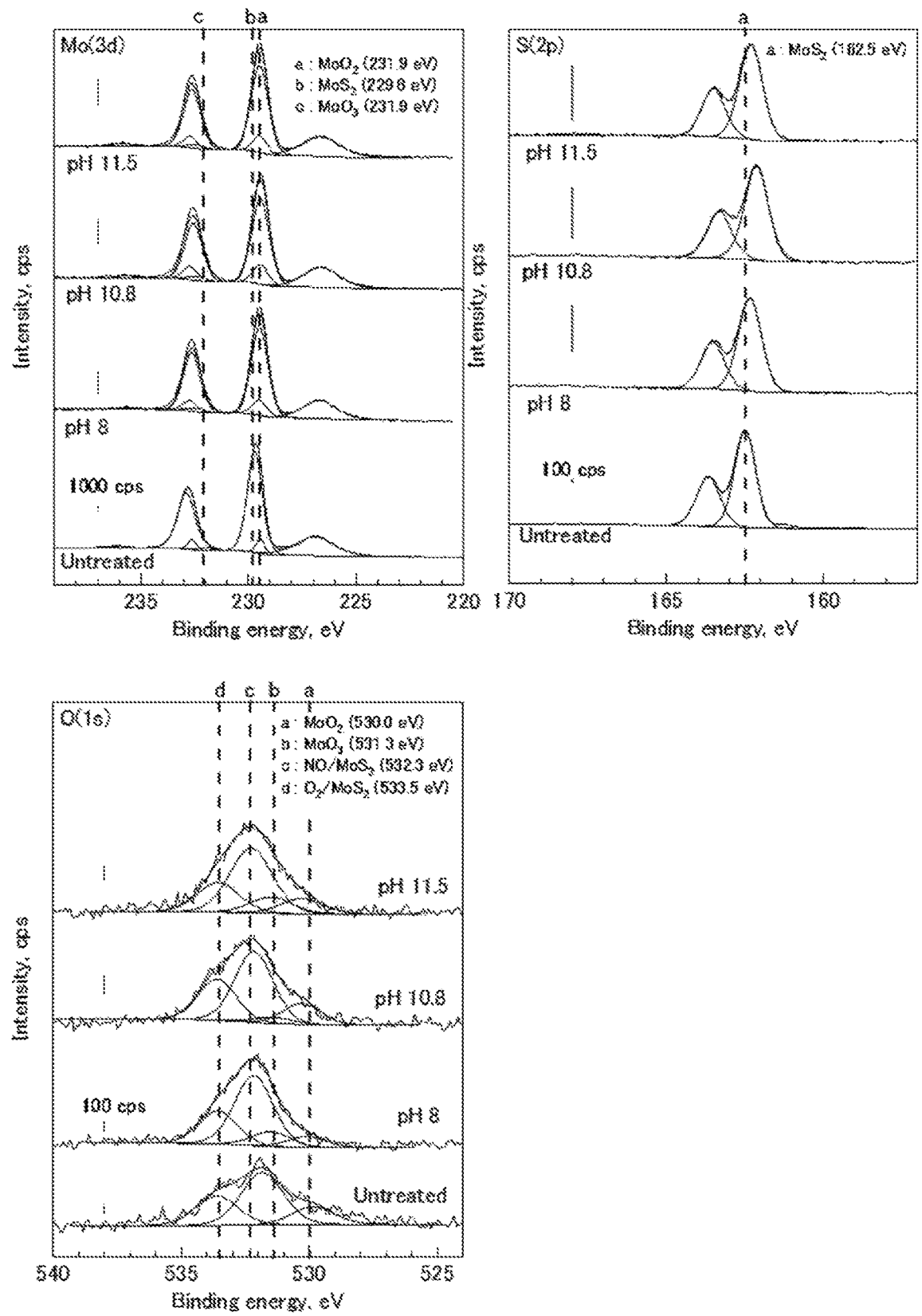
FIG. 3 is a graph showing the results of measuring molybdenite in a surface treatment test.

Before and after surface treatment, the surfaces of the minerals were measured using an X-ray photoelectron spectroscopy analyzer (XPS) (Manufacturer: SHIMADZU CORPORATION/KRATOS ANALYTICAL LTD., Model: AXIS-165). FIG. 2 shows the results of measuring chalcopyrite. FIG. 3 shows the results of measuring molybdenite.

As shown in FIG. 2, when surface treatment was performed, the resulting peak of chalcopyrite ($CuFeS_2$) decreased. Moreover, it was understood that the higher the pH, the lower the peak of chalcopyrite. Moreover, it was understood when surface treatment was performed, peaks of copper sulfate ($SO_4^{2-}$ in FIG. 2) appeared. It was understood that the higher pH, the higher the peak of copper sulfate. Furthermore, it was understood when surface treatment was performed, the peaks of iron hydroxide (FeOOH) appeared. Accordingly, it was confirmed that hydrophilic copper sulfate and iron hydroxide, for example, were generated by surface treatment, the surface of hydrophobic chalcopyrite was coated with them.

As shown in FIG. 3, even when surface treatment was performed, no changes were found in the peaks of molybdenite ($MoS_2$). It was also understood that when surface treatment was performed, the peaks of molybdenum trioxide ($MoO_3$) decreased. Accordingly, it was confirmed that surface treatment decreased hydrophilic molybdenum trioxide, resulting in the molybdenite surface with a higher level of hydrophobicity.

Furthermore, as described above, it was confirmed that when the pH is adjusted to range from 8 to 11.5, the surface condition of the molybdenum mineral can be maintained while generating hydrophilic substances on the surface of the copper mineral.

The inventors of the present application assume the reason of the generation of hydrophilic substances on the surface of chalcopyrite as follows.

A sodium sulfite aqueous solution is known as a reducing agent, and the reaction formula under basic conditions is as shown in chemical formula (1) below. However, under acidic conditions, its functions as a reducing agent are very weak and the reaction formula in such a case is as shown in chemical formula (2) below.

$$SO_3^{2-}+2OH^-\rightarrow SO_4^{2-}+H_2O+2e^- \quad (1)$$

$$SO_3^{2-}+2H^+\rightarrow SO_2+H_2O \quad (2)$$

When chalcopyrite is contacted with a sodium sulfite aqueous solution, the surface of chalcopyrite ($CuFeS_2$) is reduced by sulfurous acid ion ($SO_3^{2-}$), and thus copper sulfide ($Cu_2S$) is generated. At the same time, iron ions ($Fe^{3+}$) are generated (chemical formula (3)). The thus generated copper sulfide is immediately oxidized and dissolved, thereby generating copper ions ($Cu^{2+}$) (chemical formula (4)).

$$2CuFeS_2+6Cu^{2+}+3SO_3^{2-}+6OH^-\rightarrow 4Cu_2S+2Fe^{3+}+3SO_4^{2-}+3H_2O \quad (3)$$

$$Cu_2S\rightarrow 2Cu^{2+}+S+4e^- \quad (4)$$

As a result, for example, reactions represented by the following chemical formulae (5) to (9) proceed, thereby generating hydrophilic substances.

$$Cu^{2+}+SO_4^{2-}\rightarrow CuSO_4 \quad (5)$$

$$Cu^{2+}+2OH^-\rightarrow Cu(OH)_2 \quad (6)$$

$$Cu^{2+}+2OH^-\rightarrow CuO+H_2O \quad (7)$$

$$Fe^{3+}+3OH^-\rightarrow FeOOH+H_2O \quad (8)$$

$$2Fe^{3+}+3SO_4^{2-}\rightarrow Fe_2(SO_4)_3 \quad (9)$$

On the other hand, the above reaction does not take place on the surface of molybdenite. Instead, hydrophilic molybdenum oxide existing before treatment is reduced (the following chemical formulae (10) and (11)), increasing hydrophobicity.

$$MoO_3+2SO_3^{2-}+18H^+\rightarrow MoS_2+9H_2O \quad (10)$$

$$MoO_2+2SO_3^{2-}+16H^+\rightarrow MoS_2+8H_2O \quad (11)$$

(Flotation Test)

Next, a test for finding recovery rate upon flotation was conducted.

Example 1

Bulk Flotation:

South American copper ore (the ore extracted from porphyry-type copper deposits) was crushed using a ball mill to produce mineral slurries, followed by bulk flotation. For bulk flotation, MIBC (15 g of MIBC was added per 1t of ore) was used as a frothing agent, and diesel oil (65 g of diesel oil was added per 1t of ore) was used as a collector.

The particle size of the bulk concentrate obtained by bulk flotation was 100 μm or less (100-μm undersize particles). The solid content ratio of a mineral slurry containing the bulk concentrate was 50%. The mineral proportions of the bulk concentrate, the grade of copper and the grade of molybdenum are as shown in Table 2. Here, the mineral proportions are the results obtained by MLA analysis, and the grade of copper and the same of molybdenum are the results obtained by chemical analysis.

TABLE 2

| Chalcopyrite | Bornite | Chalcocite | Molybdenite | Cu grade | Mo grade |
|---|---|---|---|---|---|
| 51.0 | 3.0 | 4.2 | 8.6 | 22 | 4.5 |

Dispersion Step:

A bulk concentrate-containing mineral slurry (1,794 g) (solid content: 897 g, solid content ratio: 50%) was introduced into a flotation machine. The flotation machine used herein is a Denver-type flotation machine (Metso Minerals). The Denver-type flotation machine is constructed such that a hollow cylinder is vertically provided at the center of a slurry tank, a disc-like hood is fixed at the lower end of the hollow cylinder, and the underlying impeller is disposed. The rotation shaft of the impeller runs through the hollow cylinder. The impeller has a structure wherein a disc is provided with 6 to 8 blades. Rotation of the impeller produces negative pressure between the hood and the impeller, and then gas for flotation is suctioned from a suction port provided at the top of the hollow cylinder. The suction port is provided with a manual valve, by which the suction volume of gas can be adjusted. Suctioned gas is finely sheared at the circumferential end of the hood and the impeller, thereby generating gas bubbles. Gas bubbles are dispersed and fed into the liquid phase, as the impeller rotates. Nitrogen was used as gas for flotation. Specifically, a nitrogen gas container (Shikoku Iwatani Sangyo Co, ltd., liquid nitrogen with purity of 99.995% or more) was connected to the suction port at the top of the hollow cylinder via piping, thereby feeding nitrogen.

The mineral slurry was stirred for 60 minutes using the impeller (1,150 rpm) provided in the flotation machine. At this time, the suction volume of nitrogen was determined to be 0. At the initiation of the dispersion step, 15 g/t diesel oil (15 g per 1 t of ore), and 23 g of sodium hydrogen sulfite were added. The concentration of sodium hydrogen sulfite in the liquid phase of the mineral slurry was 0.25 mol/L. During the dispersion step, the pH of the liquid phase of the mineral slurry decreased. Hence, a sodium hydroxide aqueous solution having a concentration of 8 mol/L was gradually added, and then the pH of the liquid phase of the mineral slurry was maintained at 10. The amount of the sodium hydroxide aqueous solution added was 44.8 g.

Dilution Step:

Next, ion exchanged water was added, so that the solid content ratio of the mineral slurry was 33%; that is, the weight of the mineral slurry after dilution was 2,691 g. Note that, as a result of dilution, the concentration of sodium hydrogen sulfite in the liquid phase of the mineral slurry was 0.16 mol/L.

Retaining Step:

Next, the mineral slurry was retained for 5 minutes while stirring the same using the impeller (1,150 rpm) provided in the flotation machine. After the passage of the retention time, the pH of the liquid phase of the mineral slurry decreased. Therefore, 0.3 g of sodium hydroxide at a concentration of 8 mol/L was added to adjust the pH at 10.

Flotation Step:

Next, the impeller of the flotation machine was operated, gas bubbles were introduced, and thus flotation was performed. The suction volume of nitrogen was adjusted so as to avoid floating ores from overflowing from a slurry tank until the predetermined time for flotation elapsed. At each timing of 3 minutes, 8 minutes, 15 minutes, 30 minutes, and 40 minutes after the initiation of flotation, floating ores accumulated on the top surface of the slurry tank were scraped off and then collected in another container. A floating ore obtained by 3 minutes of flotation was referred to as floating ore 1, a floating ore obtained by 8 minutes of flotation was referred to as floating ore 2, a floating ore obtained by 15 minutes of flotation was referred to as floating ore 3, a floating ore obtained by 30 minutes of flotation was referred to as floating ore 4, and a floating ore obtained by 40 minutes of flotation was referred to as floating ore 5.

Flotation recovery rate was found by the following procedure. First, the amounts of copper and molybdenum in a bulk concentrate were found in advance by ICP analysis (ICP analyzer: EKO Instruments, Model: SPS3000). After flotation, the thus recovered floating ores 1 to 5 were each subjected to acid dissolution, and then the amounts of copper and molybdenum in floating ores 1 to 5 were found by ICP analysis. Subsequently, according to the following formula, the flotation recovery rate was found as the proportion of the amount of metal (recovered amount) recovered as a floating ore relative to the amount (input) of metal in the bulk concentrate.

Flotation recovery rate[%]=100×recovered amount/input

Example 2

Bulk flotation was performed in the same manner as in Example 1.

Dispersion Step:

A bulk concentrate-containing mineral slurry (1,794 g) (solid content: 897 g, solid content ratio: 50%) was introduced into the flotation machine. The mineral slurry was stirred for 60 minutes using an impeller (1,150 rpm) provided in the flotation machine. At this time, the suction volume of nitrogen was determined to be 0. At the initiation of the dispersion step, 15 g/t diesel oil (15 g per 1t of ore) was added. No sodium hydrogen sulfite was added. Without the need of pH adjustment, the pH of the liquid phase of the mineral slurry was maintained at 10.

Dilution Step:

Next, ion exchanged water was added, so that the solid content ratio of the mineral slurry was 33%, that is, the weight of the mineral slurry after dilution was 2,691 g.

Retaining Step:

Next, 23 g of sodium hydrogen sulfite was added to the mineral slurry. The concentration of sodium hydrogen sulfite in the liquid phase of the mineral slurry was 0.16 mol/L. The mineral slurry was retained for 5 minutes while stirring the same using the impeller (1,150 rpm) provided in the flotation machine. After the passage of the retention time, the pH of the liquid phase of the mineral slurry decreased. Therefore, 39.4 g of sodium hydroxide at a concentration of 8 mol/L was added to adjust the pH at 10.

Next, flotation was performed in the same manner as in Example 1.

Example 3

Bulk flotation was performed in the same manner as in Example 1.

Dispersion Step:

A bulk concentrate-containing mineral slurry (1,794 g) (solid content: 897 g, solid content ratio: 50%) was introduced into the flotation machine. The mineral slurry was stirred for 60 minutes using the impeller (1,150 rpm) provided in the flotation machine. At this time, the suction volume of nitrogen was determined to be 0. At the initiation of the dispersion step, 15 g/t diesel oil (15 g per 1t of ore) was added and 1.15 g of sodium sulfite was added. The concentration of sodium sulfite in the liquid phase of the mineral slurry was 0.01 mol/L. During the dispersion step, the pH of the liquid phase of the mineral slurry decreased. Therefore, a sodium hydroxide aqueous solution having a concentration of 4 mol/L was gradually added to maintain the pH of the liquid phase of the mineral slurry at 10. The amount of the sodium hydroxide aqueous solution added was 14.7 g.

Dilution Step:

Next, ion exchanged water was added so that the solid content ratio of the mineral slurry was 33%, that is, the weight of the mineral slurry after dilution was 2,691 g. Note that as a result of dilution, the concentration of sodium sulfite in the liquid phase of the mineral slurry was 0.005 mol/L.

Retaining Step:

Next, the mineral slurry was retained for 5 minutes while stirring the same using the impeller (1,150 rpm) provided in the flotation machine. After the passage of the retention time, the pH of the liquid phase of the mineral slurry decreased. Therefore, 0.6 g of sodium hydroxide at a concentration of 4 mol/L was added to adjust the pH at 10.

Next, flotation was performed in the same manner as in Example 1. Since a sufficient effect was obtained by 30 minutes of flotation, flotation was completed, and no sample was collected at 40 minutes of flotation.

Comparative Example 1

Bulk flotation was performed in the same manner as in Example 1.

Dispersion Step:

A bulk concentrate-containing mineral slurry (1,794 g) (solid content: 897 g, solid content ratio: 50%) was introduced into the flotation machine. The mineral slurry was stirred for 60 minutes using the impeller (1,150 rpm) provided in the flotation machine. At this time, the suction volume of nitrogen was determined to be 0. At the initiation of the dispersion step, 15 g/t diesel oil (15 g per 1t of ore) was added. No sodium hydrogen sulfite was added. The pH of the liquid phase of the mineral slurry was maintained at 10 without the need of pH adjustment.

Dilution Step:

Next, ion exchanged water was added so that the solid content ratio of the mineral slurry was 33%, that is, the weight of the mineral slurry after dilution was 2,691 g.

Retaining Step:

The mineral slurry was retained for 5 minutes while stirring the same using the impeller (1,150 rpm) provided in the flotation machine. No sodium hydrogen sulfite was added. Moreover, the pH of the liquid phase of the mineral slurry was maintained at 10 without the need of pH adjustment.

Next, flotation was performed in the same manner as in Example 1.

Figure 4A:
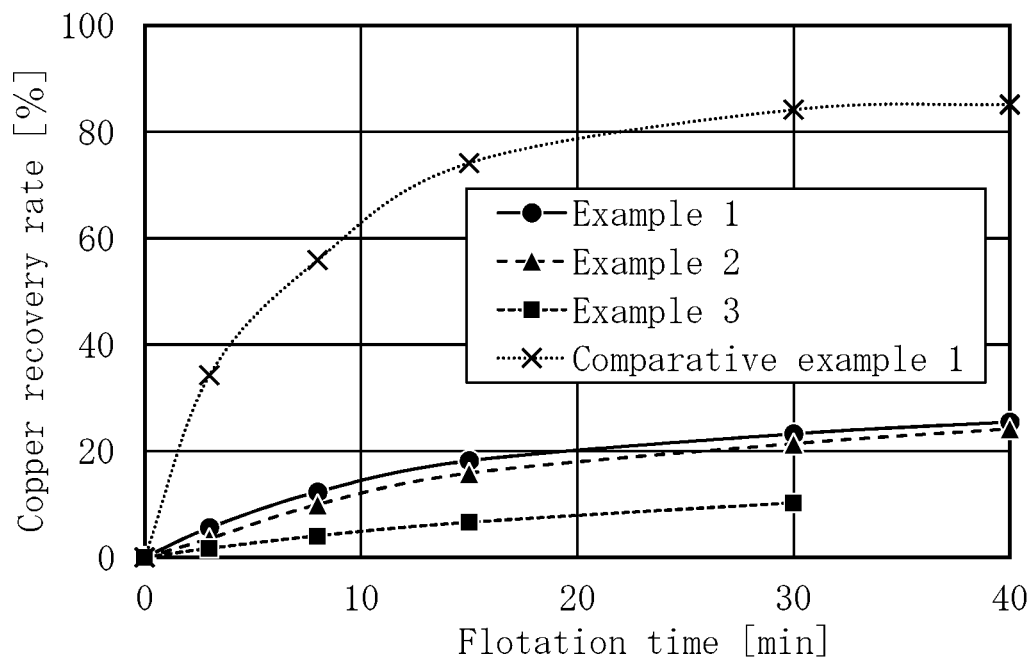
FIG. 4A is a graph showing copper recovery rates in a flotation test.
Figure 4B:
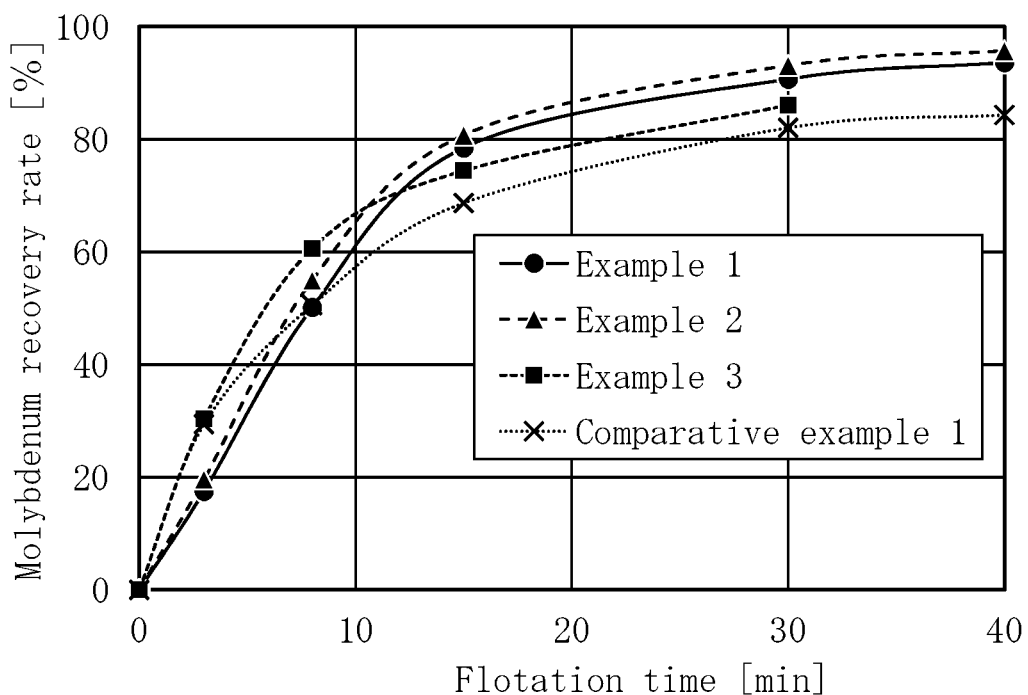
FIG. 4B is a graph showing molybdenum recovery rates in a flotation test.

Copper recovery rates and molybdenum recovery rates in Examples 1, 2, and 3 and Comparative example 1 are shown in Table 3 and FIGS. 4A and 4B. Note that the flotation recovery rate is the integrated value of flotation recovery rates found for floating ores 1 to 5.

TABLE 3

| | Flotation time [min] | Cu recovery rate [%] | Mo recovery rate [%] | Recovery rate difference |
|---|---|---|---|---|
| Example 1 | 3 | 5.58 | 17.50 | 11.92 |
| | 8 | 12.31 | 50.13 | 37.82 |
| | 15 | 18.15 | 78.47 | 60.32 |
| | 30 | 23.21 | 90.67 | 67.46 |
| | 40 | 25.43 | 93.61 | 68.18 |
| Example 2 | 3 | 3.55 | 19.61 | 16.06 |
| | 8 | 9.95 | 54.99 | 45.04 |
| | 15 | 15.83 | 80.75 | 64.92 |
| | 30 | 21.37 | 93.10 | 71.73 |
| | 40 | 24.16 | 95.70 | 71.54 |
| Example 3 | 3 | 1.70 | 30.34 | 28.64 |
| | 8 | 4.06 | 60.59 | 56.53 |
| | 15 | 6.60 | 74.40 | 67.80 |
| | 30 | 10.28 | 86.05 | 75.77 |
| Comparative example 1 | 3 | 34.25 | 29.42 | −4.83 |
| | 8 | 55.88 | 50.53 | −5.35 |
| | 15 | 74.13 | 68.67 | −5.46 |
| | 30 | 84.13 | 82.01 | −2.12 |
| | 40 | 85.12 | 84.31 | −0.81 |

Differences in copper recovery rate were found to be produced between Examples 1 and 2 (sodium hydrogen sulfite was added) and Comparative example 1 (no sodium hydrogen sulfite was added). On the other hand, no significant difference in molybdenum recovery rate was found to be produced between Examples 1 and 2 (sodium hydrogen sulfite was added) and Comparative example 1 (no sodium hydrogen sulfite was added). It was also found that in all of these cases, the longer the flotation time, the more increased the flotation recovery rate, however, the flotation recovery rate remained almost unchanged after the passage of 25 minutes or longer.

In Table 3, a difference in flotation recovery rate between copper and molybdenum is referred to as a difference in recovery rate. The larger the difference in recovery rate, the easier the separation by flotation. A difference in recovery rate was about 70% in Examples 1 and 2, indicating that the copper mineral and the molybdenum mineral can be separated from each other by flotation, whereas, the copper mineral and the molybdenum mineral cannot be separated from each other by flotation in Comparative example 1.

Furthermore, the copper recovery rate was found to be lower in Example 3 (sodium sulfite was added) than those in Examples 1 and 2 (sodium hydrogen sulfite was added). On the other hand, the molybdenum recovery rates were found to be almost the same among Examples 1, 2 and 3. The difference in recovery rate in Example 3 was about 75%, which was found to be higher than differences in recovery rate (about 70%) in Examples 1 and 2. Hence, it was understood that the effect of separating a copper mineral from a molybdenum mineral is higher in the case of using sodium sulfite as a surface treatment agent than the case of using sodium hydrogen sulfite as the same.

The amount of sodium hydrogen sulfite added in Examples 1 and 2 was 23 g. On the other hand, the amount of sodium sulfite added in Example 3 was 1.15 g. Therefore, it was understood that the use of sodium sulfite as a surface treatment agent can reduce the amount to be added and the cost for drugs more significantly than the use of sodium hydrogen sulfite as the same.

As described above, it was confirmed that through addition of sulfite to a mineral slurry, a copper mineral and a molybdenum mineral can be separated from each other by flotation. In particular, it was confirmed that through the use of sodium sulfite, a copper mineral and a molybdenum mineral can be efficiently separated from each other.

The invention claimed is:

1. A mineral processing method, comprising:
   a conditioning step of adding sulfite as a surface treatment agent to a mineral slurry containing a copper mineral and a molybdenum mineral; and
   a flotation step of performing flotation which separates the molybdenum mineral as a floating ore and the copper mineral as a precipitating ore of the mineral slurry after the conditioning step,
   wherein the conditioning step comprises adding a pH adjusting agent to adjust the pH of the liquid phase of the mineral slurry to range from 8 to 11.5;
   wherein the sulfite is sodium hydrogen sulfite; and
   wherein in the conditioning step, the sodium hydrogen sulfite is added at 0.10 mol/L to 0.25 mol/L in the liquid phase of the slurry.

2. The mineral processing method according to claim 1, wherein the conditioning step further comprises:
   a dispersion step of stirring the mineral slurry to disperse mineral particles contained in the mineral slurry;
   a dilution step of diluting the mineral slurry after the dispersion step; and
   a retaining step of retaining the mineral slurry for a predetermined time period after the dilution step,
   wherein in any one of the dispersion step, the dilution step, and the retaining step, the surface treatment agent is added to the mineral slurry.

3. The mineral processing method according to claim 1, wherein
   the copper mineral is a mixed copper sulfide mineral containing chalcopyrite and bornite and chalcocite, and
   the molybdenum mineral is molybdenite.

4. The mineral processing method according to claim 1, wherein the conditioning step includes a dispersion step of stirring the mineral slurry containing sulfite to disperse mineral particles contained in the mineral slurry.

* * * * *